(12) United States Patent
Ho et al.

(10) Patent No.: US 8,208,394 B2
(45) Date of Patent: Jun. 26, 2012

(54) SERVICE DATA UNIT DISCARD TIMERS

(75) Inventors: Sai Yiu Duncan Ho, San Diego, CA (US); Peter Anthony Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 12/260,807

(22) Filed: Oct. 29, 2008

(65) Prior Publication Data

US 2009/0116399 A1    May 7, 2009

Related U.S. Application Data

(60) Provisional application No. 60/983,904, filed on Oct. 30, 2007.

(51) Int. Cl.
*G01R 31/08* (2006.01)
(52) U.S. Cl. ... 370/252; 370/328; 370/392; 370/395.21; 370/395.4
(58) Field of Classification Search ............ 370/328, 370/252, 392, 394, 395.21, 395.4
See application file for complete search history.

(56) References Cited

U.S. PATENT DOCUMENTS

| | | | |
|---|---|---|---|
| 6,857,095 B2 | 2/2005 | Suumaki et al. | |
| 7,286,563 B2 | 10/2007 | Chang et al. | |
| 2004/0004954 A1* | 1/2004 | Terry et al. | 370/349 |
| 2006/0098574 A1* | 5/2006 | Yi et al. | 370/236 |
| 2007/0268932 A1* | 11/2007 | Lee et al. | 370/469 |
| 2008/0189786 A1* | 8/2008 | Tang et al. | 726/24 |
| 2008/0298322 A1* | 12/2008 | Chun et al. | 370/335 |
| 2009/0103478 A1* | 4/2009 | Sammour et al. | 370/328 |

FOREIGN PATENT DOCUMENTS

| | | |
|---|---|---|
| JP | 2006005949 A | 1/2006 |
| RU | 2242092 C2 | 12/2004 |
| WO | WO 0060799 * | 4/2000 |
| WO | WO0060799 A1 | 10/2000 |

(Continued)

OTHER PUBLICATIONS

Ericsson: "Details of SDU Discard Function" 3GPP DRAFT; R2-080230, 3rd Generation Partnership Project (3GPP), Mobile Competence Centre; 650, Route Des Lucioles; F-06921 Sophia-Antipolis Cedex; France, v o 1 . tsg_ran\WG2_RL2\TSGR2_60bis\Docs, no. Sevilla, Spain; 20080114, Jan. 8, 2008, XP050138097 the whole document.

(Continued)

*Primary Examiner* — Kibrom T Hailu
(74) *Attorney, Agent, or Firm* — Nerrie M. Zohn

(57) ABSTRACT

Systems and methodologies are described that facilitate enforcing quality of service requirements. A first timer is employed for each data packet arriving at a packet data convergence protocol layer of a wireless communications apparatus. The first timer can be configured based upon delay tolerance specified according to quality of service requirements imposed on the data packet. The data packet can be discarded if the timer expires before the data packet leaves the protocol data convergence protocol layer. In addition, a second time is utilized for the data packet as it arrives at a radio link control layer. The data packet can be discarded if the second timer expires before the data packet is successfully transmitted to a receiver.

27 Claims, 12 Drawing Sheets

FOREIGN PATENT DOCUMENTS

| WO | WO2004008673 A2 | 1/2004 |
|---|---|---|
| WO | WO2006083131 A1 | 8/2006 |

OTHER PUBLICATIONS

International Search Report and Written Opinion—PCT/US2008/081875, International Search Authority—European Patent Office—Mar. 23, 2009.

Translation of Office Action in Russian application 2010121839 corresponding to U.S. Appl. No. 12/260,807, citing WO0060799A1 and JP2006005949 dated Feb. 14, 2011.

Ericsson: "PDCP re-ordering at handover", 3GPP TSG-RAN WG2 #59, R2-073224, Athens, Greece, Aug. 20-24, 2007, XP050135951.

Ericsson: "RLC Window Operation", 3GPP TSG-RAN WG2 #59-bis, R2-074072, Shanghai, China, Oct. 8-12, 2007, pp. 1-3, XP050136702.

Ericsson: "SDU Discard", 3GPP TSG-RAN WG2 #59-bis, R2-074073, Shanghai, China, Oct. 8-12, 2007, XP050136703.

Ericsson: "Specifying AQM for the UE", 3GPP TSG-RAN WG2 #59-bis, R2-074047, Shanghai, China, Oct. 8-12, 2007, pp. 1-3, XP050136682.

* cited by examiner

SERVICE DATA UNIT DISCARD TIMERS

CROSS-REFERENCE TO RELATED APPLICATIONS

This application claims the benefit of U.S. Provisional Patent application Ser. No. 60/983,904 entitled "METHODS AND APPARATUSES FOR HANDLING DATA PACKET DISCARDS IN WIRELESS COMMUNICATIONS SYSTEMS" which was filed Oct. 30, 2007. The entirety of the aforementioned application is herein incorporated by reference.

BACKGROUND

I. Field

The following description relates generally to wireless communications, and more particularly to employing timers to determine packet delay and packet discarding.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams, carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

In wireless communications, data packets can have limited useful lifetimes due to quality of service (QoS) support and restraints. A data packet, delayed at various sub-layers in a transmitter, can become stale if the delay extends beyond its lifetime. Stale data packets can be discarded to avoid consumption of limited resources associated with over-the-air transmission.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described related to enforcing quality of service requirements. A first timer is employed for each data packet arriving at a packet data convergence protocol layer of a wireless communications apparatus. The first timer can be configured based upon delay tolerance specified according to quality of service requirements imposed on the data packet. The data packet can be discarded if the timer expires before the data packet leaves the protocol data convergence protocol layer. In addition, a second time is utilized for the data packet as it arrives at a radio link control layer. The data packet can be discarded if the second timer expires before the data packet is successfully transmitted to a receiver.

According to an aspect a method that facilitates enforcing quality of service requirements is provided. The method can comprise initiating a first timer associated with a data packet arriving at a packet data convergence protocol layer. Further, the method can include detecting expiration of the first timer. In addition, the method can also include discarding the data packet when the data packet resides at the packet data convergence protocol layer upon timer expiry.

Another aspect relates to a communications apparatus that facilitates discarding data packets delayed beyond a tolerance. The communications apparatus can include a packet data convergence protocol (PDCP) module that obtains a data packet, the PDCP module generates a protocol data unit based upon the data packet. The communications apparatus can also comprise radio link control (RLC) module that retains the protocol data unit generated by the PDCP module pending successful transmission. Further, the communications apparatus can include a timer module that manages at least a PDCP timer and a RLC timer, wherein the PDCP timer relates to time the data packet spends at the PDCP module and the RLC timer relates to time the protocol data unit resides at the RLC module. In addition, the communications apparatus can comprise a discard module that, upon expiration of a timer, discards one of: the data packet if the PDCP timer expires before generation of the protocol data unit or the protocol data unit if the RLC timer expires before successful transmission.

Yet another aspect relates to a wireless communications apparatus that facilitates enforcing quality of service requirements. The wireless communications apparatus can include means for initiating a first timer associated with a data packet arriving at a packet data convergence protocol layer. The wireless communications apparatus can also comprise means for detecting expiration of the first timer. In addition, the wireless communications apparatus can include means for discarding the data packet when the data packet resides at the packet data convergence protocol layer upon timer expiry.

Still another aspect relates to a computer program product, which can have a computer-readable medium. The computer-readable medium can include code for causing at least one computer to initiate a first timer associated with a data packet arriving at a packet data convergence protocol layer. The computer-readable medium can also comprise code for causing the at least one computer to detect expiration of the first timer. Further, the computer-readable medium can include code for causing the at least one computer to discard the data packet when the data packet resides at the packet data convergence protocol layer upon first timer expiration. In addition, the computer-readable medium can comprise code for causing the at least one computer to detect expiration of the second timer. The computer-readable medium can also comprise code for causing the at least one computer to discard the protocol data unit when the protocol data unit resides at the radio link control protocol layer upon second timer expiration.

Another aspect relates to an apparatus in a wireless communications system. The apparatus can comprise a processor configured to initiate a first timer associated with a data packet arriving at a packet data convergence protocol layer. The processor can, also be configured to discard the data packet when the data packet resides at the packet data convergence protocol layer upon first timer expiration. The processor can further be configured to start a second timer associated with the protocol data unit upon arrival at the radio link control protocol layer. The processor can also be configured to discard the protocol data unit when the protocol data unit resides at the radio link control protocol layer upon second timer expiration.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
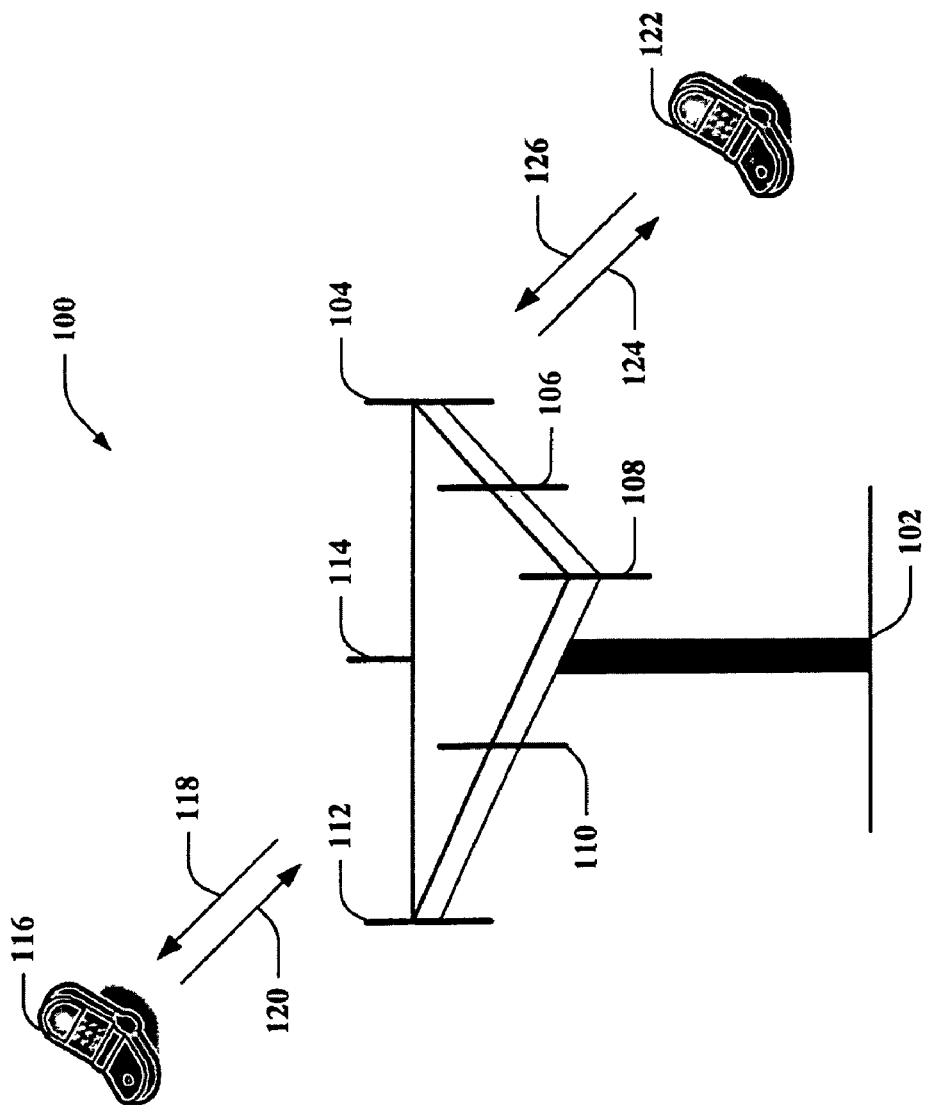
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object; an executable, a thread of execution, a program, and/or a computer. By way of illustration, both an application running on a computing device and the computing device can be a component. One or more components can reside within a process and or thread of execution and a component can be localized on one computer and/or distributed between two or more computers. In addition, these components can execute from various computer readable media having various data structures stored thereon. The components can communicate by way of local and or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA200.0 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112, and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Pursuant to an illustration, base station 102 and/or mobile devices 116 and 122 can have quality of service (QoS) requirements with respect to transmission of data packets. The data packets can possess limited delay time that can be incurred prior to transmissions. If delay time associated with a data packet elapses, the packet can be considered stale or too old to be useful to a receiver. To avoid utilizing over-the-air resources on stale packets, delayed packets can be discarded if associated delay time elapses. For instance, the base station 102 and/or mobile device 116 and 122 can employ one or more timers that measure delay associated with a data packet. A data packet can be discarded by a transmitter if a timer expires prior to transmission of the packet.

In one example, mobile devices 116 and 122 can have QoS requirements associated with transmissions on an uplink to base station 102. Alternatively or concurrently, base station 102 can support QoS requirements on downlink transmissions. For either an uplink or downlink transmission, a data packet will enter a packet data convergence protocol (PDCP) layer. After the PDCP layer, the data packet enters a radio link control (RLC) layer for further processing. After the RLC layer, the data packet is managed by the medium access control (MAC) layer prior to transmission by the physical layer (e.g., over-the-air). A timer can be started as a data packet enters the PDCP layer. The timer can be configured based upon QoS requirements associated with the packet. If the timer expires before the packet leaves the PDCP layer, the packet can be discarded. If the packet is forwarded to the RLC layer prior to timer expiration, a second timer can be started. The second timer can be configured according to the QoS requirements and time utilized by the PDCP layer. If the second timer expires prior to transmission, the data packet can be discarded. In accordance with another aspect, a single timer can be employed wherein the timer starts as the packet enters the PDCP layer. If the packet is delayed long enough to enable the timer to expire, the packet can be discarded as being stale.

Figure 2:
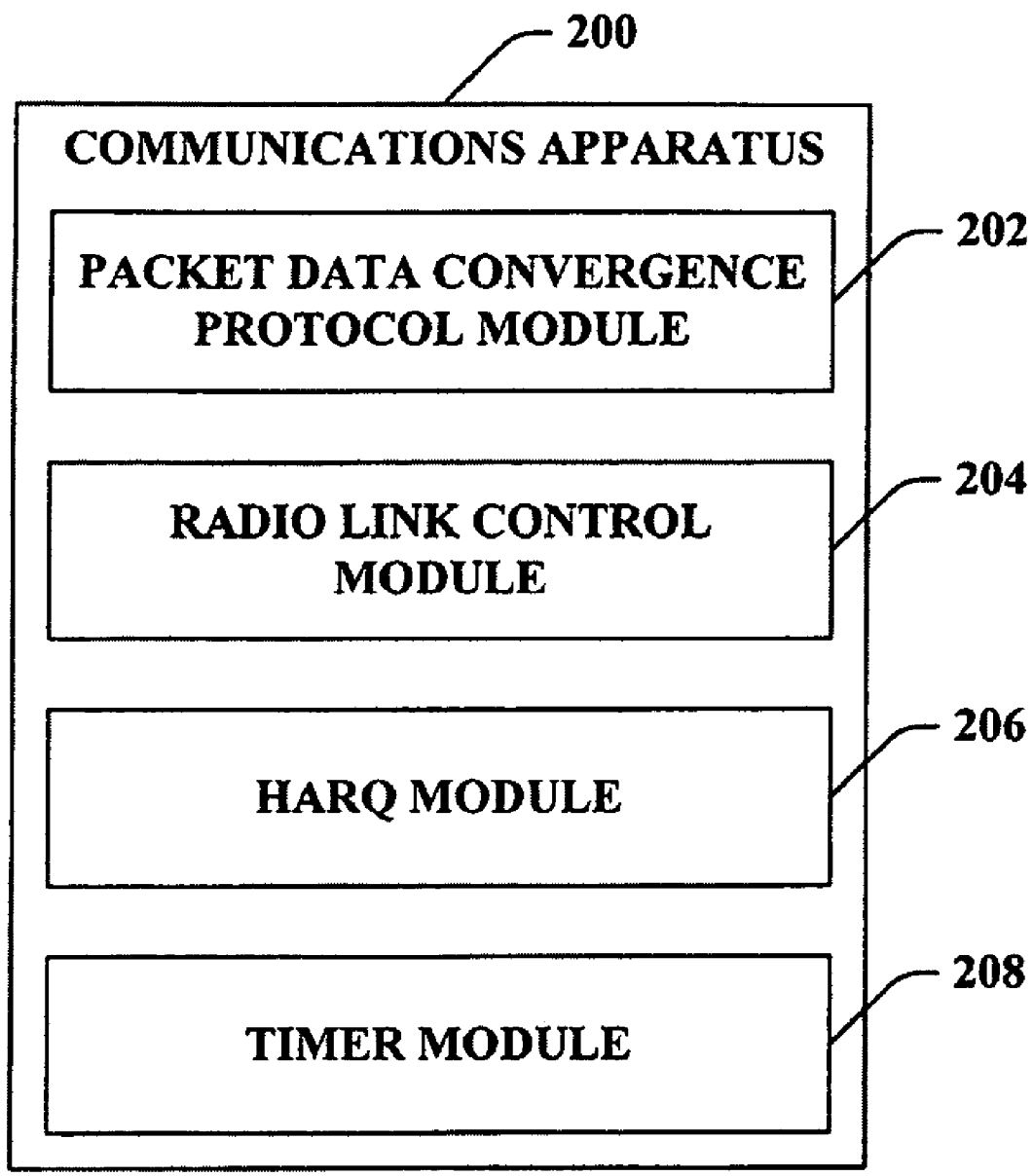
FIG. 2 is an illustration of an example communications apparatus for employment within a wireless communications environment in accordance with an aspect.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a packet data convergence (PDCP) module 202 that can manage the PDCP layer in wireless communications. For example, the PDCP module 202 can perform IP header compression and decompression, user data transfer, maintenance of sequence numbers for radio bearers and the like. The communications apparatus 200 can further include a radio link control (RLC) module 204 that provides RLC protocol functionality. The PDCP module 202 and the RLC module 204 can generate and/or pack information into headers, packets, payloads, protocol data units (PDUs), etc. associated with their respective protocols.

In one aspect, the communications apparatus 200 can process Internet Protocol (IP) packets (e.g., data packets) from upper layer protocols such as data application, voice over IP applications and the like. The communications apparatus 200 can process IP or data packets to enable the packet to be transmitted on a wireless link in a wireless communications system. Pursuant to an illustration, a data packet (e.g., IP packet) can be obtained by the PDCP module 202 from an upper layer (not shown). The PDCP module 202 can assign the data packet a PDCP sequence number. In an example, PDCP sequence numbers can be utilized to facilitate acknowledgement of reception by a receiver or to facilitate reordering of data packets by a receiver. The PDCP module 202 can also provide ciphering, integrity protection and/or header compression of data packets, in particular, user data packets. For instance, the PDCP module 202 can utilize at least one ciphering key to generate a ciphered data packet or employ an integrity key to enable integrity protection. In addition, the PDCP module 202 can provide header compression. In an illustrative embodiment, the PDCP module 202 can utilize a Robust Header Compression (RoHC) framework. The PDCP module 202 can utilize a plurality of header compression algorithms or profiles. Each algorithm or profile can be specific to a particular network layer, transport layer or any combination thereof. For example, a particular profile can be associated with TCP/IP, another profile corresponds to UDP/IP and so on.

The PDCP module 202, after processing, can generate a PDCP protocol data unit (PDU) that can be forwarded to the RLC layer managed by the RLC module 204. In one aspect, the RLC module 204 can provide functions such as error recovery and/or flow control. For example, the RLC module 204 can collect RLC service data units (SDUs) (e.g., PDCP PDUs) from the PDCP module 202. The RLC module 204 can assign RLC sequence numbers to the RLC SDUs as well as generate necessary RLC header information. The RLC module 204 can generate RLC PDUs through concatenation or other combination of RLC SDUs and associated header information. The RLC module 204 can transfer generated RLC PDUs to a lower layer (e.g., MAC layer) for data transfer over a wireless link, for example. In accordance, with one aspect, the RLC module 204 can submit RLC PDUs to a hybrid automatic repeat request (HARQ) module 206 that can maintain a plurality of parallel HARQ processes to enable multiple transmissions to take place simultaneously while waiting for feedback on successful or unsuccessful reception of previous transmissions.

If the wireless communications system supports quality of service (QoS), the communications apparatus 200 can observe imposed QoS requirements. For example, one such QoS requirement specifies maximum one-way delay between a base station and a mobile device (e.g., one-way delay for downlink transmissions) while another QoS requirement can specify maximum one-way delay between the mobile device and the base station (e.g., uplink delay). The delay requirement can be interpreted as the delay between a time when a data packet enters the PDCP layer at the transmitter and a time when the data packet emerges from the PDCP layer at the receiver. The communications apparatus 200 can observe, during preparation and transmission, delay requirements or tolerance associated with particular data packets. For instance, if a particular data packet is delayed at the transmitter beyond an associated delay time, the data packet is considered too old or stale. A stale data packet can be discarded to avoid consuming limited radio resources.

To enforce, QoS requirements, the communications apparatus 200 can include a timer module 208 that can measure time that a data packet remains in the PDCP layer and/or the RLC layer prior to transmission. Pursuant to an illustration, the timer module 208 can start a timer as a data packet enters the PDCP layer for processing by the PDCP module 202. The timer can be associated with an individual data packet such that the timer measures delay with respect to the individual data packet. The timer can be configured in accordance with the QoS requirements of the flow. For instance, the timer can be set to a delay tolerance (e.g., total delay budget) of the QoS flow associated with the data packet. If the timer expires before the data packet leaves the PDCP layer, the data packet is discarded. If the data packet leaves the PDCP layer prior to timer expiration, the timer is stopped and a PDCP PDU (e.g., data packet with PDCP sequence number assigned) is provided to the RLC module 204.

As the PDCP PDU enters the RLC layer to be further handled by the RLC module 204, the timer module 208 initiates a second timer that is individually associated with the PDCP PDU. The second timer can be configured to the total delay budget less time spent in the PDCP layer. The RLC module 204 generates a RLC PDU from the PDCP PDU (e.g., RLC SDU) and delivers the RLC PDU to the HARQ module 206 for transmission. If the second timer expires before the RLC module 204 delivers the RLC PDU, the RLC PDU is discarded. In addition, any RLC SDUs, PDCP PDUs, or data packets corresponding to the discarded RLC PDU can also be discarded.

According to another aspect, the second timer can continue to run after the RLC module 204 delivers the RLC PDU to the HARQ module 206 for transmission. In particular, the second timer continues until successful transmission and reception is recorded. If the second timer expires prior to successful reception, the RLC PDU (and corresponding SDUs, and PDUs in other layers) can be discarded.

It is to be appreciated that any discard mechanism can be employed. However, as discard at the RLC can introduce a gap in both RLC sequence numbers and PDPC sequence numbers, a standardized mechanism should be employed to enable sequence number synchronization between receivers and transmitters (e.g., mobile devices and base stations). In the particular case of downlink transmissions (e.g, a base station is a transmitter), the scheduler can account for a number of HARQ retransmission and a number of ARQ retransmissions in order to target delivery of the RLC SDU to the receiver prior to timer expiration. If the scheduler determines a low probability of successful reception prior to expiration of the timer, the RLC module 204 can forego converting the RLC SDU to a PDU and providing the PDU to the HARQ module 206.

Moreover, although not shown, it is to be appreciated that communications apparatus 200 can include memory that retains instructions with respect to ciphering data packets, assigning PDCP sequence numbers to data packets, compressing data packet headers, assigning RLC sequence numbers, and the like. In addition, the memory can retain instructions relating to initiating timers, configuring timers, managing timers, stopping timers, measuring timers, detecting timer expirations, etc. Further, the memory can include instructions with respect to discarding data packets, PDPC PDUs, RLC SDUs and/or RLC PDUs upon timer expiration. Moreover, the memory can retain buffers that preserve data packets, PDUs and or SDUs during processing by the PDCP layer and/or the RLC layer. Further, communications apparatus 200 may include a processor that may be utilized in connection with executing instructions (e.g., instructions retained within memory, instructions obtained from a disparate source, . . . ).

Figure 3:
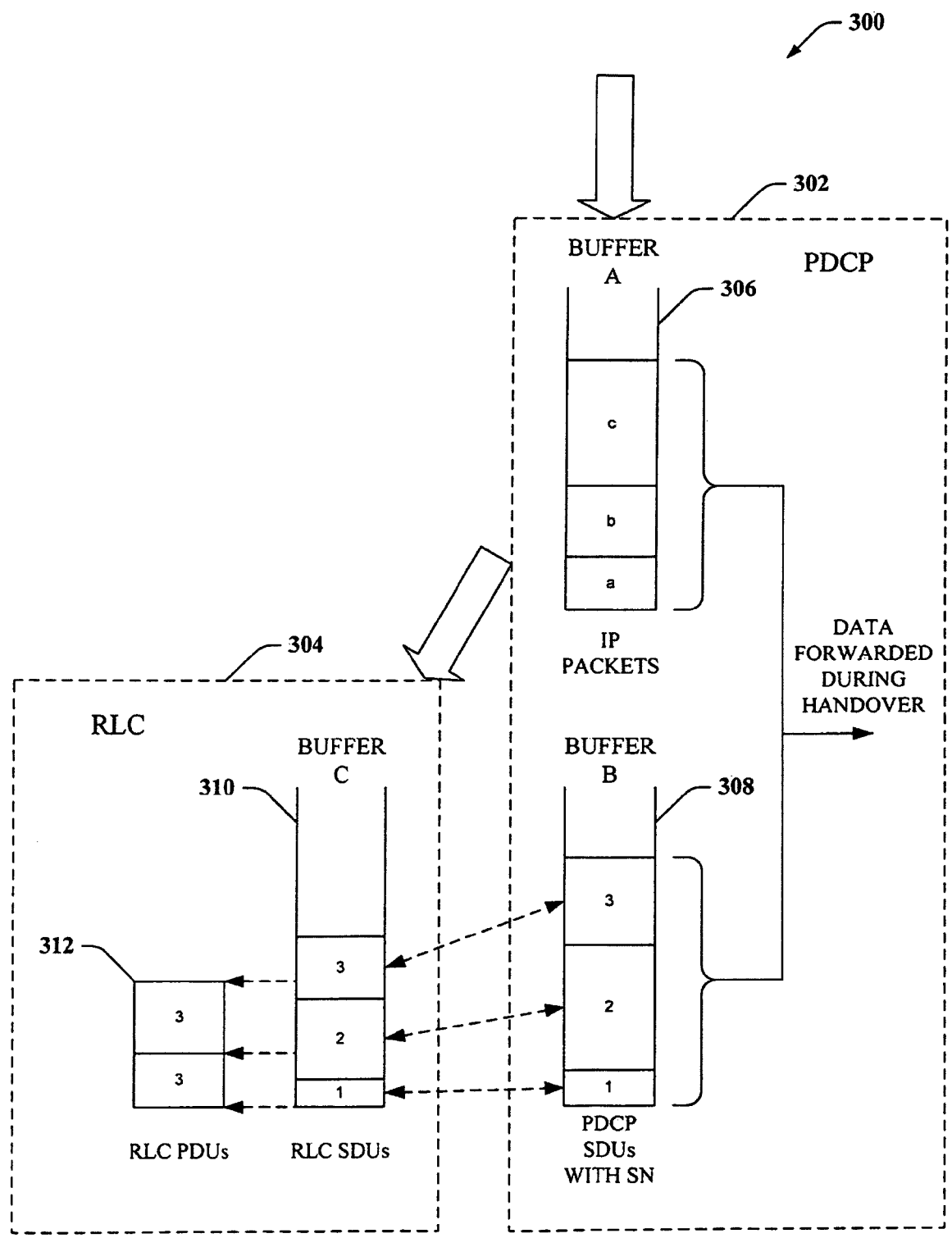
FIG. 3 is an illustration of an example buffer model in accordance with an aspect of the subject disclosure.

Turning to FIG. 3, illustrated is an example buffer model 300 that facilitates operation of a packet data convergence protocol (PDCP) layer 302 and a radio link control (RLC) layer 304. The PDCP layer 302 can include Buffer A 306 that retains incoming IP or data packets provided to the PDCP layer 302 for transmission over a wireless link. For instance, Buffer A 306 is depicted retaining IP packets a, b and c. The PDCP layer 302 can also include Buffer B 308 that retains all IP packets with an assigned PDCP sequence number. Buffer B 308 can include all IP packets or PDCP SDUs that are not ciphered, integrity protected or compressed. Ciphered and compressed PDCP PDUs can be provided to the RLC layer 304 that includes Buffer C 310. Buffer C 310 retains RLC SDUs (e.g., PDCP PDUs) that have been completely or partially delivered to a HARQ layer (not shown). It is to be appreciated that all RLC SDUs retained in Buffer C 310 can have corresponding PDCP SDUs retained in Buffer B 308 that are unciphered and uncompressed. In addition, the RLC SDUs in Buffer C 310 can have corresponding RLC PDUs 312 with RLC sequence numbers assigned that have been delivered to the HARQ layer. Pursuant to an illustration, all data in Buffer A 306 and Buffer B 308, corresponding to downlink data, can be forward to a target base station via an X2 interface if a handover occurs. For data in Buffer A 306 and Buffer B 308 corresponding to uplink data, all the data can be compressed and ciphered with a new key associated with the target base station.

In accordance with an example, an IP packet can enter the PDCP layer 302 and reside in Buffer A 306. The PDCP layer 302 can assign a sequence number, cipher the IP packet and perform header compression on the IP packet to generate a PDCP PDU. The generated PDCP PDU can be delivered to the RLC layer 304. In addition, an unciphered and uncompressed IP packet with the sequence number corresponding to the PDU can be retained in Buffer B. The generated PDPC PDU delivered to the RLC layer 304 can be considered an RLC SDU and can be retained in Buffer C 310. The RLC layer 304 can assign an RLC sequence number to the RLC SDU to construct an RLC PDU that is provided to the HARQ layer for transmission.

Figure 4:
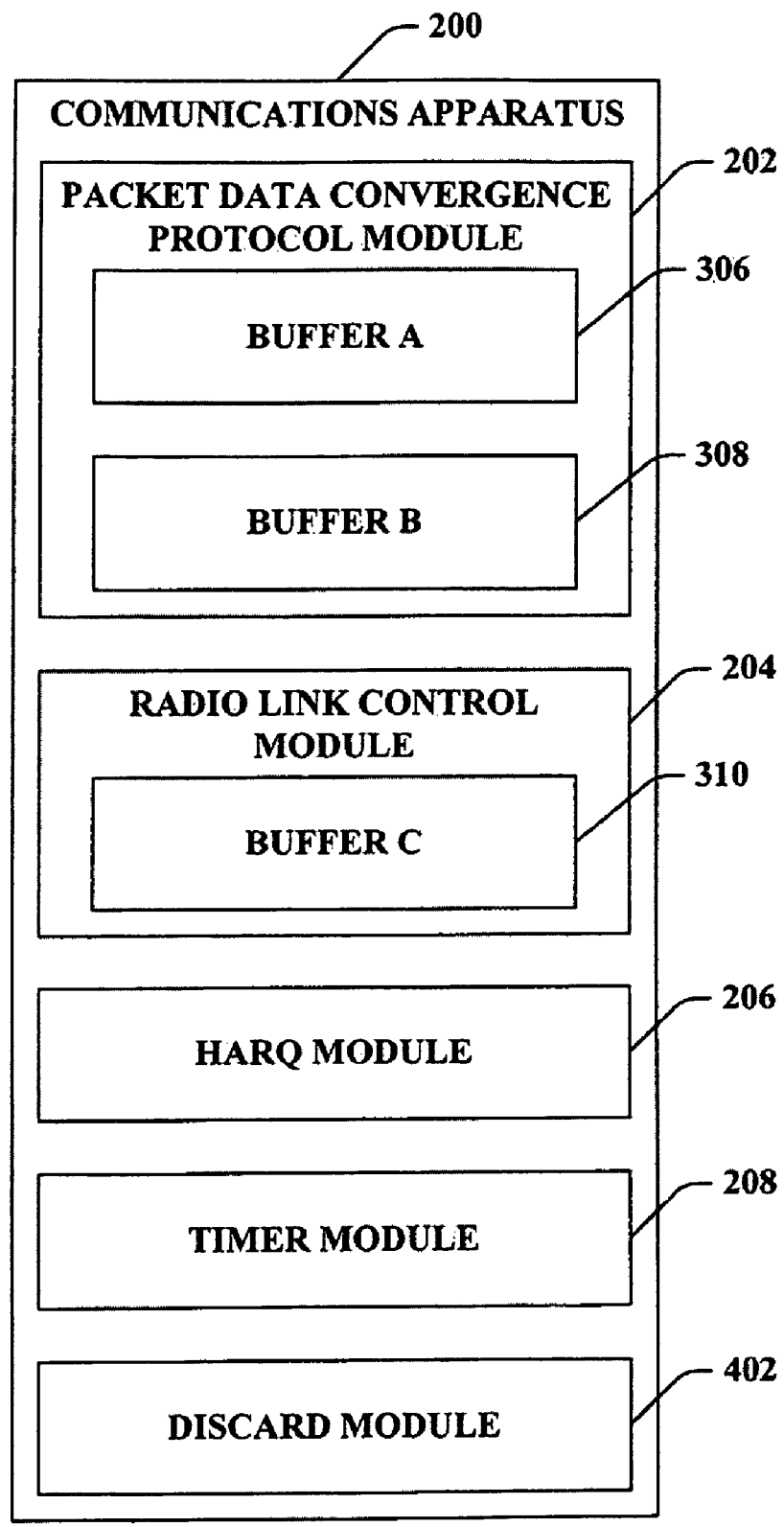
FIG. 4 is an illustration of an example communications apparatus for employment within a wireless communications environment in accordance with another aspect of the subject disclosure.

FIG. 4 depicts a communications apparatus 200 for employment within a wireless communications environment. The communications apparatus 200 can be substantially similar to the communications apparatus described with respect to FIG. 2. The communications apparatus 200 can include a packet data convergence protocol (PDCP) module 202 that facilitates PDCP layer processing of data packets, a radio link control (RLC) module 204 that effectuates RLC layer processing of PDCP PDUs (e.g., data packets after PDPC processing), and a HARQ module 206 that facilitates transmission of data packets over a wireless link (e.g., downlink and/or uplink channel). Moreover, the PDCP module 202 can include Buffer A 306 that retains incoming data packets provided to the PDPC module from upper layers such as, but not limited to, applications. The PDCP module 202 can further include Buffer B 308 that retains unciphered and uncompressed data packets with sequence numbers assigned. The RLC module 204 can include Buffer C that retains ciphered and compressed RLC SDUs (e.g., PDCP PDUs) partially or completely provided to the HARQ module 206 for transmission. In addition, the communications apparatus 200 can include a timer module 208 that can measure time that a data packet remains in the PDCP layer and/or the RLC layer prior to transmission.

The communications apparatus 200 can employ the timer module 208 to observe QoS requirements (e.g., delay requirements or tolerances) associated with data packets. Pursuant to an illustrative embodiment, the timer module can start a PDCP timer as a data packet is provided to the PDCP module 202 and retained in Buffer A 306. The PDCP timer can be uniquely associated with the data packet such the PDCP timer measures delay time for a single data packet. The timer module 208 can create and start PDCP timers for each data packet retained in Buffer A 306. The PDCP timer can be configured according to QoS requirements associated with the data packet. For example, the QoS requirements can specify a particular delay time or tolerance for the data packet. The PDCP timer can be set to the delay tolerance such that expiration of the timer to indicate that the data packet has exceeded the tolerance and is stale.

As described supra, the PDCP module 202 can assign a sequence number to the data packet. In addition, the PDCP module 202 can cipher the data packet and/or provide integrity protection. Further, the PDPC module 202 can compress the data packet header in accordance with one or more profiles corresponding to protocols associated with the data packet. The PDCP module 202 can generate a PDCP PDU corresponding to the data packet by assigning the sequence number, ciphering and compressing the data packet. The PDCP module 202 can provide the PDCP PDU to the RLC module 204. In addition, an unciphered and uncompressed version of the data packet (e.g., a PDCP SDU) with the sequence number can be retained in Buffer B 308 in case of a handover. If the PDCP timer expires before the PDCP module 202 delivers the data packet to the RLC module 204, the communications apparatus 200 includes a discard module 402 that can discard the data packet. Since a sequence is not yet assigned, the data packet can be discarded without extraneous impact on the wireless communication system beyond that to the application or other entity that originates the data packet. Accordingly, the discard module 402 can employ a variety of abandonment techniques. If, however, the PDCP module 202 can create a ciphered and compressed data packet with a sequence number prior to termination of the timer, the timer module 208 can stop the PDCP timer and record a measure of the elapsed time.

The RLC module 204 can retain the PDCP PDU (or RLC SDU) generated by the PDCP module 202 in Buffer C 310. Upon obtainment of the RLC SDU, the timer module 208 can initiate a RLC timer associated with the RLC SDU. The RLC timer can be configured to delay tolerance of the data packet minus the elapsed time spent in the PDCP layer (e.g., time measured by the PDCP module 202). The RLC module 204 assigns a RLC sequence number and converts the RLC SDU to a RLC PDU that is provided to the HARQ module 206 for transmission. The RLC timer continues until the HARQ module 206 obtains acknowledgement of successful reception by a receiver of the RLC PDU. If the RLC timer expires before successful reception, the discard module 402 can discard the RLC SDU associated with the RLC timer. In addition, the discard module 402 can discard the related RLC PDU delivered to the HARQ module 206 and the corresponding PDCP SDU retained in Buffer B 308. A discard due to expiration of the RLC timer can introduce a RLC sequence number gap and a PDCP sequence number gap. Accordingly, the discard module 402 can employ a standardized discard technique to ensure sequence number synchronization between transmitter and receiver. In another aspect, a mechanism agreed upon between transmitter and receiver can be utilized in place of a system-wide standard mechanism.

Figure 5:
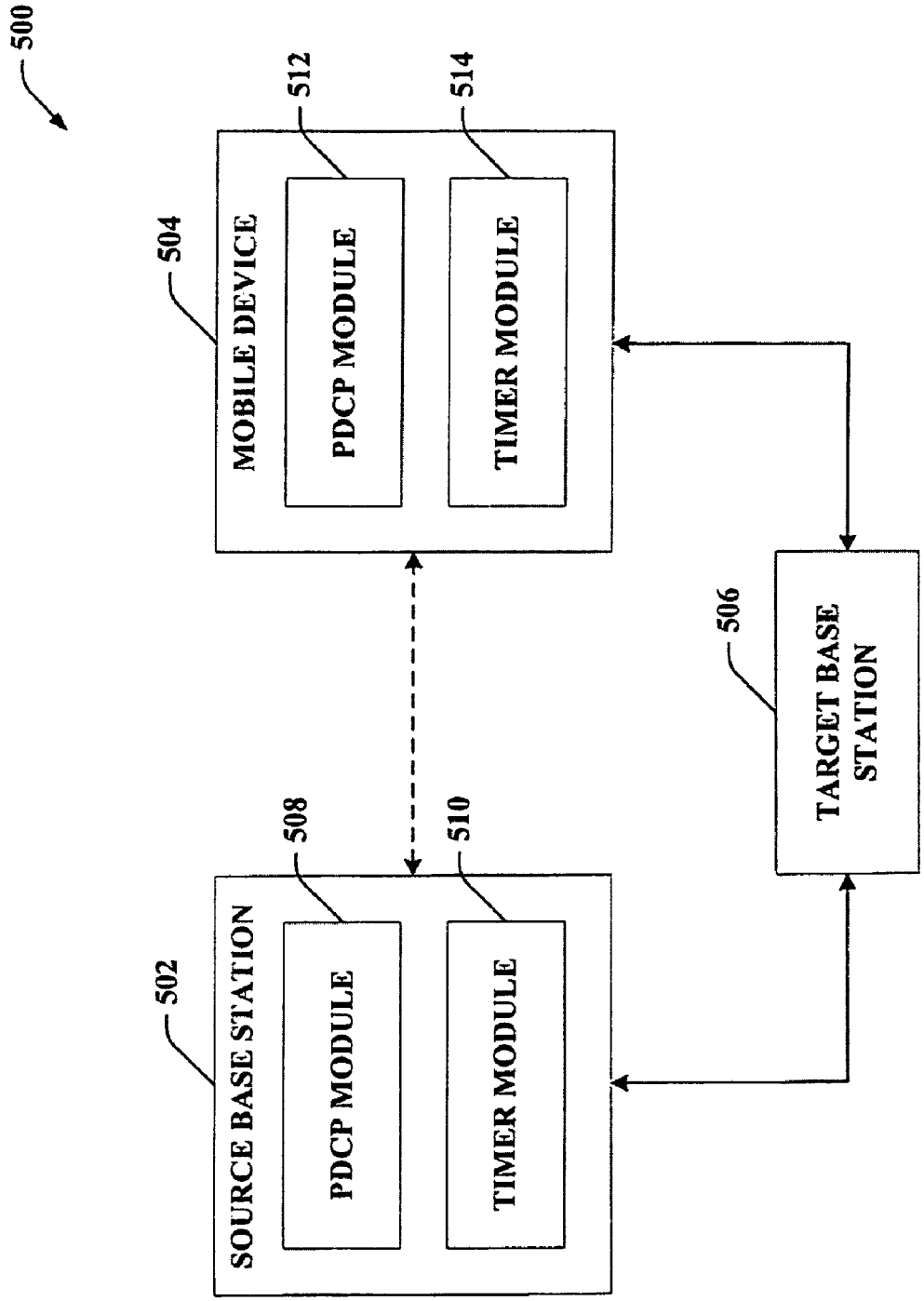
FIG. 5 is an illustration of example system that facilitates discarding data packets during handovers.

Now referring to FIG. 5, illustrated is a wireless communications system 500 that facilitates employing timers to observe QoS requirements associated with transmission of data packets. The system 500 includes a source base station 502 that can communicate with a mobile device 504 (and/or any number of disparate devices (not shown)). The base station 502 can transmit information to the mobile device 504 over a forward link channel or downlink channel; further base station 502 can receive information from the mobile device 504 over a reverse link channel or uplink channel. Moreover, system 500 can be a MIMO system. Additionally, the system 500 can operate in an OFDMA wireless network (such as 3GPP, 3GPP2, 3GPP LTE, etc., for example). Also, the components and functionalities shown and described below in the base station 502 can be present in the mobile device 504 and vice versa, in one example.

The base station 502 can include a PDCP module 508 that can mange the PDCP layer in wireless communications. In particular, the PDCP module 508 can obtain data packets for transmission on a downlink. The PDCP module 508 can assign sequence numbers to data packers, cipher packets, compress data packet headers and the like. In addition, the PDCP module 508 can obtain PDCP PDUs from lower layers wherein the PDUs have been transmitted on an uplink channel to the base station 502. Similarly, the mobile device 504 can include a PDCP module 512 that manages the PDCP layer for the mobile device. The PDCP module 512 performs similar operations to the PDCP module 506. It is to be appreciated that the PDCP modules 508 and 512 can be substantially similar and/or provide similar functionality as PDCP module 202 as described supra with reference to FIGS. 2 and 4.

The system 500 can include a target base station to which the mobile device 504 hands off to from the source base station 502. The mobile device 504 can evaluate cell quality indicators and generate measurement reports related to cell quality. These measurements report can indicate a change in a best serving cell. For instance, a target cell serviced by the target base station 506 can become a better cell than a source cell serviced by the source base station 502 and currently utilized by the mobile device 504. A handover can be initiated by the source base station 502 after receiving a report that the target base station 506 provides a better serving cell.

The source base station 502 and the mobile device 504 can include timer modules 510 and 514, respectively. Timer modules 510 and 514 can provide PDCP timers and RLC timers as discussed supra with respect to timer module 208. In addition, the timer modules 510 and 514 can initiate handover timers that enable additional delay tolerance for data packets during handovers. When handover commences, a handover timer can start for each PDCP PDU in the PDCP layer. Timer module 510 of the source base station 502 manages handover timers with respect to downlink PDUs that are forwarded to the target base station 506 via an X2 interface. If the handover timer associated with a particular PDU expires prior to forwarding, the PDU is discarded and not forwarded to the target base station 302. In similar fashion, the timer module 514 of the mobile device 504 manages handover timers for each uplink PDU. The uplink PDUs are ciphered and compressed in accordance with a new keyset associated with the target base station 506 prior to transmission to the target base station 506. If the handover timer expires prior to transmission, the PDUs can be discarded.

Figure 6:
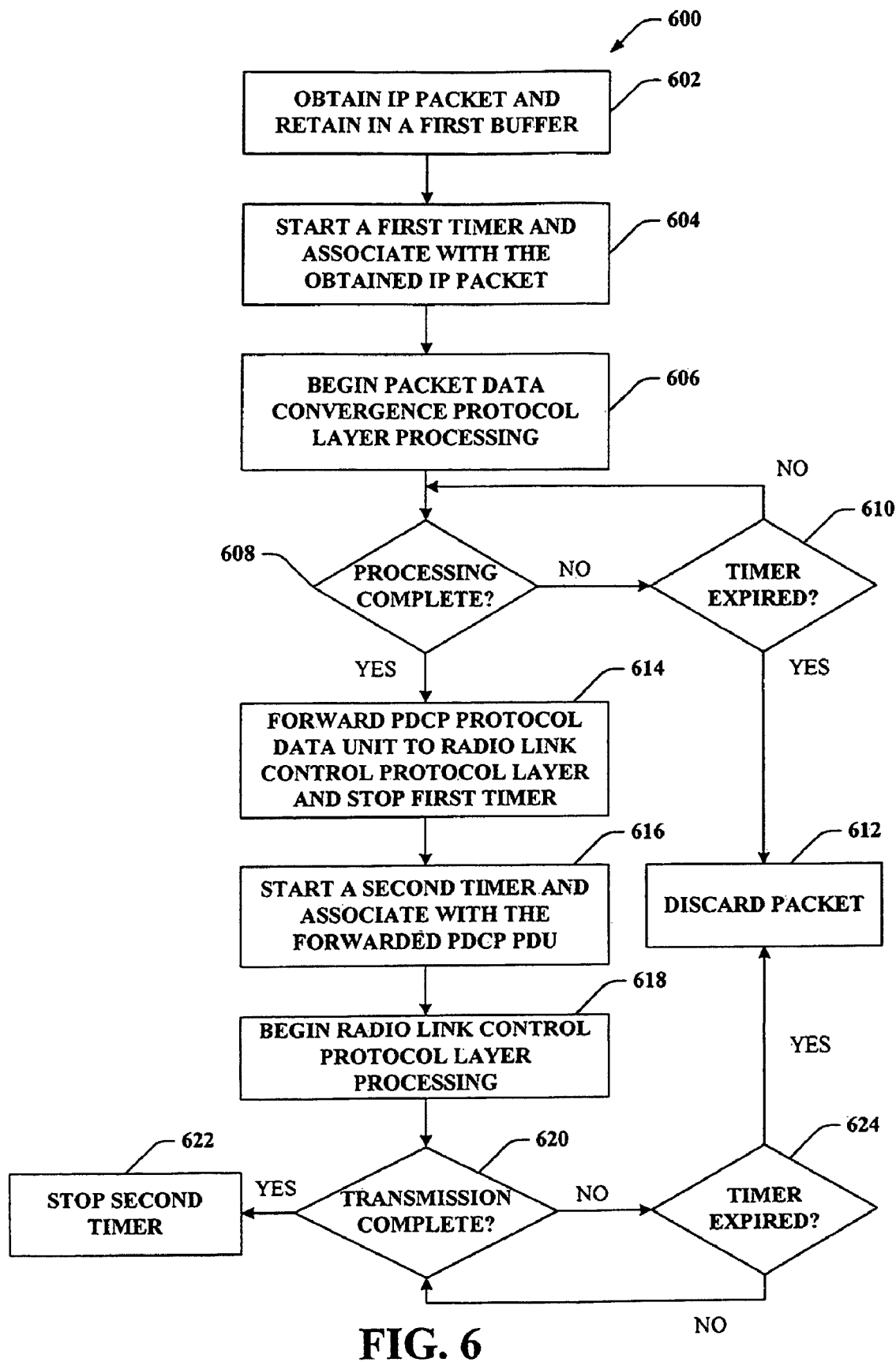
FIG. 6 is an illustration of an example methodology that facilitates utilizing timers to discard stale data packets.
Figure 7:
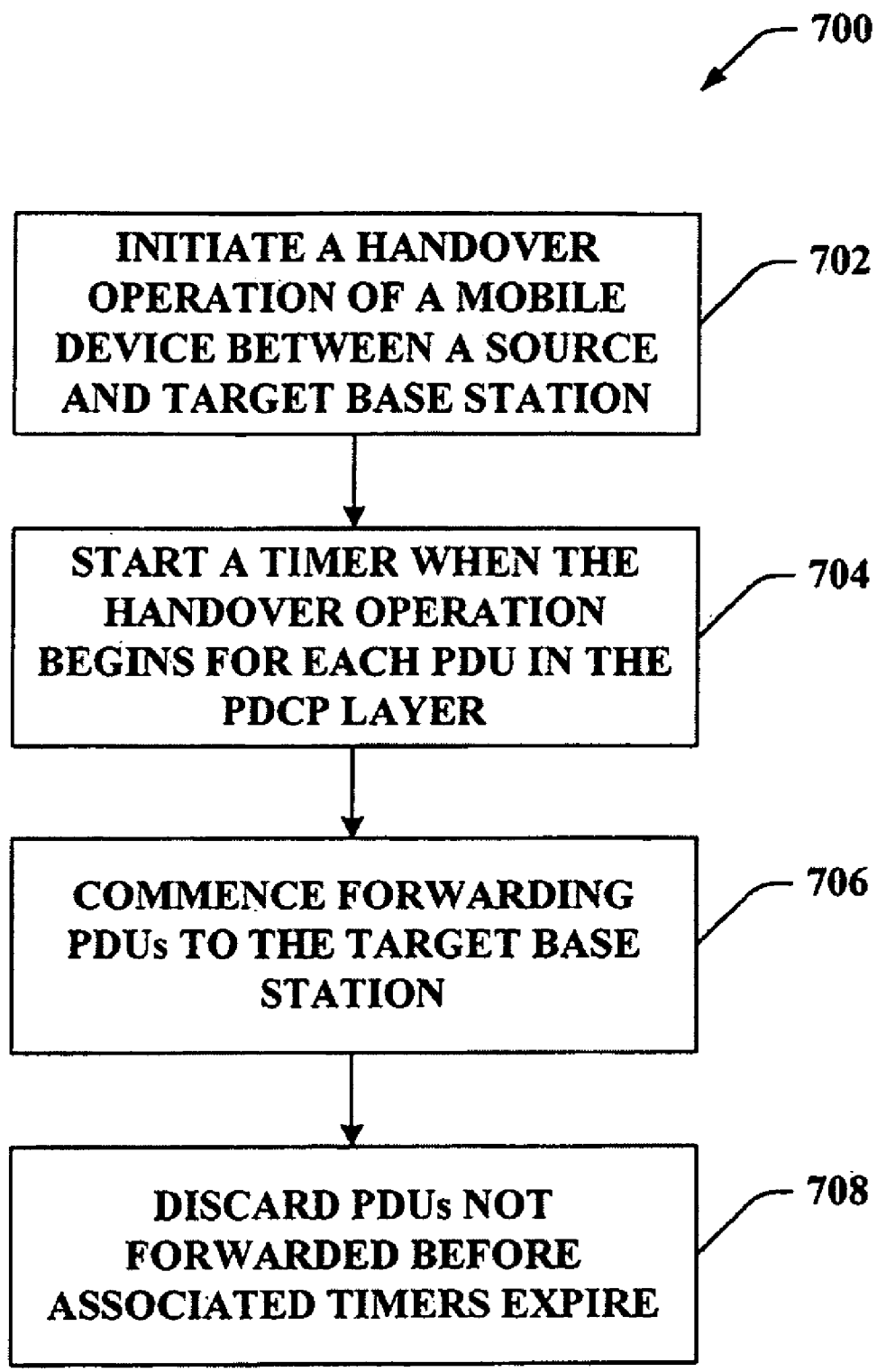
FIG. 7 an illustration of an example methodology that facilitates utilizing timers to discard stale data packets during handovers.

Referring to FIGS. 6-7, methodologies relating to utilizing timers to observe QoS requirements associated with data packets transmitted in a communications network are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates utilizing timers to discard stale data packets, such as, for example, Internet Protocol (IP) packets. In particular, the method 600 can be employed by a transmitter to send data packets in accordance with QoS requirements (e.g., delay requirements or tolerance) associated therewith. At reference numeral 602, an IP packet is obtained and stored in a first buffer. For instance, the first buffer can be employed to store IP packets incoming to a packet data convergence protocol (PDCP) layer of a transmitter. At reference numeral 604, a first timer is started and associated with the obtained IP packet. The first timer can be configured based upon a delay tolerance associated with the IP packet. Pursuant to an example, the IP packet can have an associated delay tolerance of 30 milliseconds. Accordingly, the first timer can be configured to count down from 30 milliseconds.

At reference numeral 606, PDCP layer processing begins. For example, the PDCP layer can assign a PDCP sequence number to the IP packet, cipher the IP packet and/or compress a header of the IP packet. At reference numeral 608, a determination is made as to whether PDCP layer processing is complete. If no, the method 600 proceeds to reference numeral 610 where the first timer is evaluated to ascertain if the timer expired. If the timer has expired, the method 600 proceeds to reference numeral 612 where the IP packet is discarded. If the timer is determined to not have expired at reference numeral 610, the method 600 returns to waiting for processing to complete or the first timer to expire. If PDCP processing is determined to be complete at reference numeral 608 before timer expiry, the method 600 proceeds to reference numeral 614 where a PDCP protocol data unit generated based upon the IP packet is forwarded to a radio link control (RLC) protocol layer. In addition, the first timer is stopped. At reference numeral 616, a second timer is started and associated with the PDCP PDU. The second timer can be configured based upon the delay tolerance associated with the IP packet underlying the PDCP PDU minus time spent in the PDCP layer. Pursuant to an example, the IP packet can have an associated delay tolerance of 30 milliseconds and spent 15 milliseconds in the PDCP layer before arriving at the RLC layer. Accordingly, the second timer can be configured to count down from 15 milliseconds.

At reference numeral 618, radio link control protocol layer processing commences. For example, the RLC layer can assign a RLC sequence number to the PDCP PDU and deliver to a HARQ entity for transmission. At reference numeral 620, a determination is made as to whether RLC layer processing is complete and transmission is successful. If yes, the method 600 proceeds to reference numeral 622 where the second timer is stopped and no further action is required for the initial IP packet. If no, the method 600 proceeds to reference numeral 624 where the second timer is evaluated to ascertain if the timer expired. If the timer has expired, the method 600 proceeds to reference numeral 612 where the RLC PDU, RLC SDU and PDCP SDU are discarded. If the timer is determined to not have expired at reference numeral 624, the method 600 returns to waiting for a successful transmission or the second timer to expire.

Referring now to FIG. 7, illustrated is a methodology 700 that facilitates utilizing timers to discard stale data packets during handovers. In particular, method 700 can be employed by a mobile device and/or a source base station during handovers of the mobile device to a target base station. At reference numeral 702, a handover operation of a mobile device between a source and target base station is initiated. At reference numeral 704, a timer is stared for each PDU in the PDCP layer of the source base station (e.g., downlink data) and/or the PDCP layer of the mobile device (e.g., uplink data). The timer introduces additional delay time to enable packets to be forwarded to the target base station before discard. At reference numeral 706, forwarding of PDUs to the target base station begins. For example, a source base station can forward PDUs via an X2 interface to a target base station. A mobile device ciphers and compresses PDUs in accordance with a new key associated with the target base station. At reference numeral 708, PDUs not forwarded to the target base station prior to expiration associated timers are discarded.

It will be appreciated that, in accordance with one or more aspects described herein, inferences can be made regarding configuring timers, determining if discards are probable, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
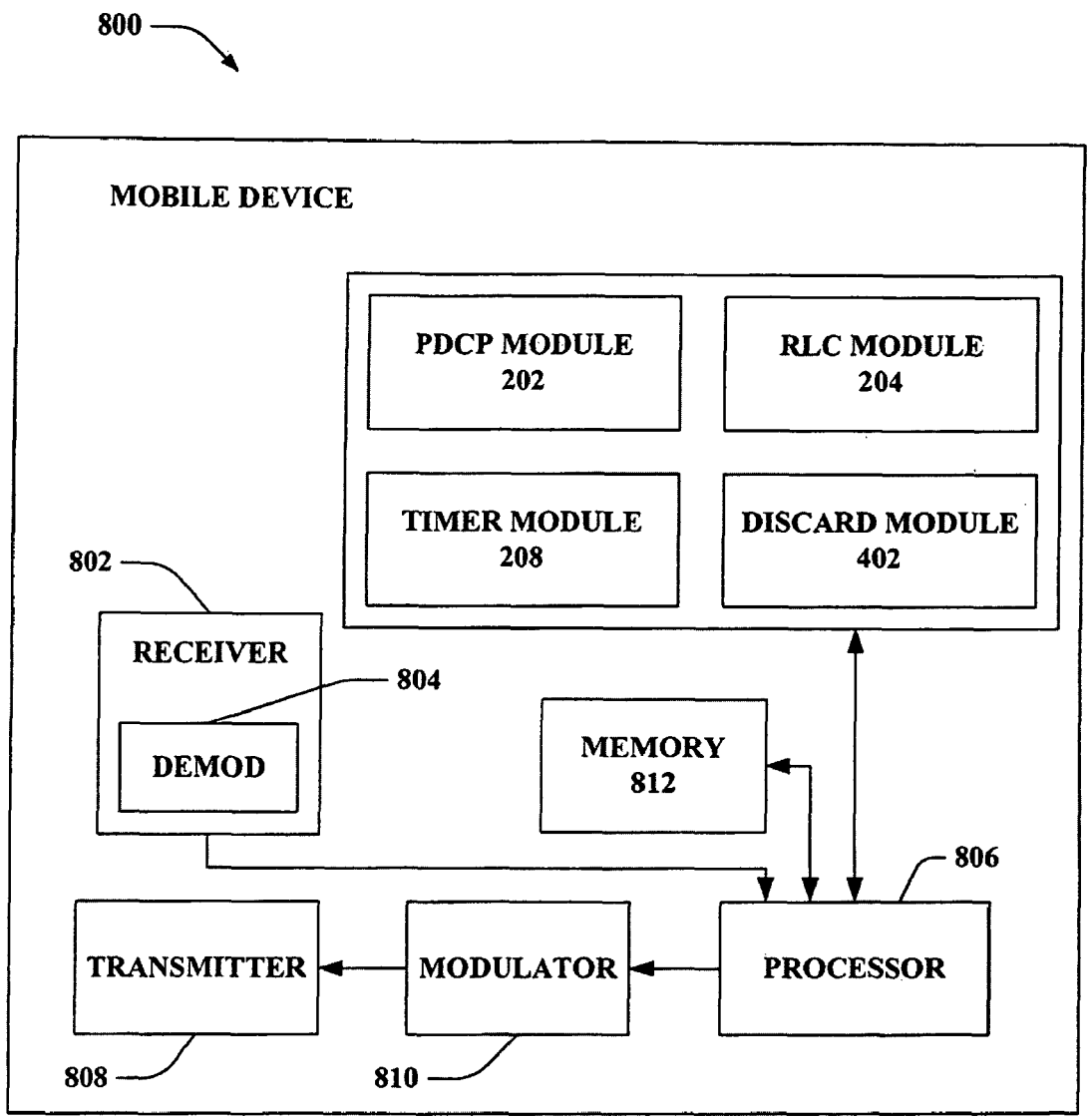
FIG. 8 is an illustration of an example system that facilitates employing timers to discard state data packets.

FIG. 8 is an illustration of a mobile device 800 that can facilitate communications associated with a mobile device in a wireless communication system in accordance with an aspect of the disclosed subject matter. It is to be appreciated that the mobile device 800 can be the same or similar as, and/or can comprise the same or similar functionality as, mobile device 116, mobile device 504 or communications apparatus 200, such as more described herein, for example, with regard to system 100, system 500, methodology 600, and methodology 700.

Mobile device 800 can comprise a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800. Mobile device 800 can also comprise a modulator 810 that can work in conjunction with the transmitter 808 to facilitate transmitting signals (e.g., data) to, for instance, a base station (e.g., 102, 502), another mobile device (e.g., 122), etc.

In one aspect, the processor 806 can be connected to a PDCP module 202 that can manage the PDCP layer in wireless communications. For example, the PDCP module 202 can perform IP header compression and decompression, user data transfer, maintenance of sequence numbers for radio bearers and the like. In another aspect, the processor 806 can be connected to a RLC module 204 that can that provides RLC protocol layer functionality. The processor 806 also can be connected to a timer module 208 that can measure time that a data packet remains in the PDCP layer and/or the RLC layer, with respect to a QoS delay requirement, prior to transmission. The processor 806 also can be connected to a discard module 402 that can facilitate discarding IP packets that have been delayed in PDCP layer past timer expiration or RLC SDUs, RLC PDUs, and PDCP SDUs that have not been successfully transmitted prior to timer expiration.

Mobile device 800 can additionally comprise memory 812 that is operatively coupled to processor 806 and that can store data to be transmitted, received data, information related to available channels, data associated with analyzed signal and or interference strength, information related to an assigned channel, power, rate, or the like, and any other suitable information for estimating a channel and communicating via the channel. Memory 812 can additionally store protocols and/or algorithms associated with estimating and/or utilizing a channel (e.g., performance based, capacity based, etc.). Further, memory 812 can retain prioritized bit rates, maximum bit rates, queue sizes, etc., related to one or more bearers serviced by the mobile device 800.

It will be appreciated that the data store (e.g., memory 812) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 812 of the subject systems and methods is intended to comprise, without being limited to, these and any other suitable types of memory.

It is to be appreciated and understood that the PDCP module 202, RLC module 204, timer module 208, discard module 402, and memory 812 each can be the same or similar as, or can comprise the same or similar functionality as, respective components such as more fully described herein, for example, with regard to system 200, system 300, system 400, and system 500. It is to be further appreciated and understood that the PDCP module 202, RLC module 204, timer module 208, discard module 402, and memory 812 each can be a stand-alone unit (as depicted), can be included within the processor 806, can be incorporated within another component, and/or virtually any suitable combination thereof, as desired.

Figure 9:
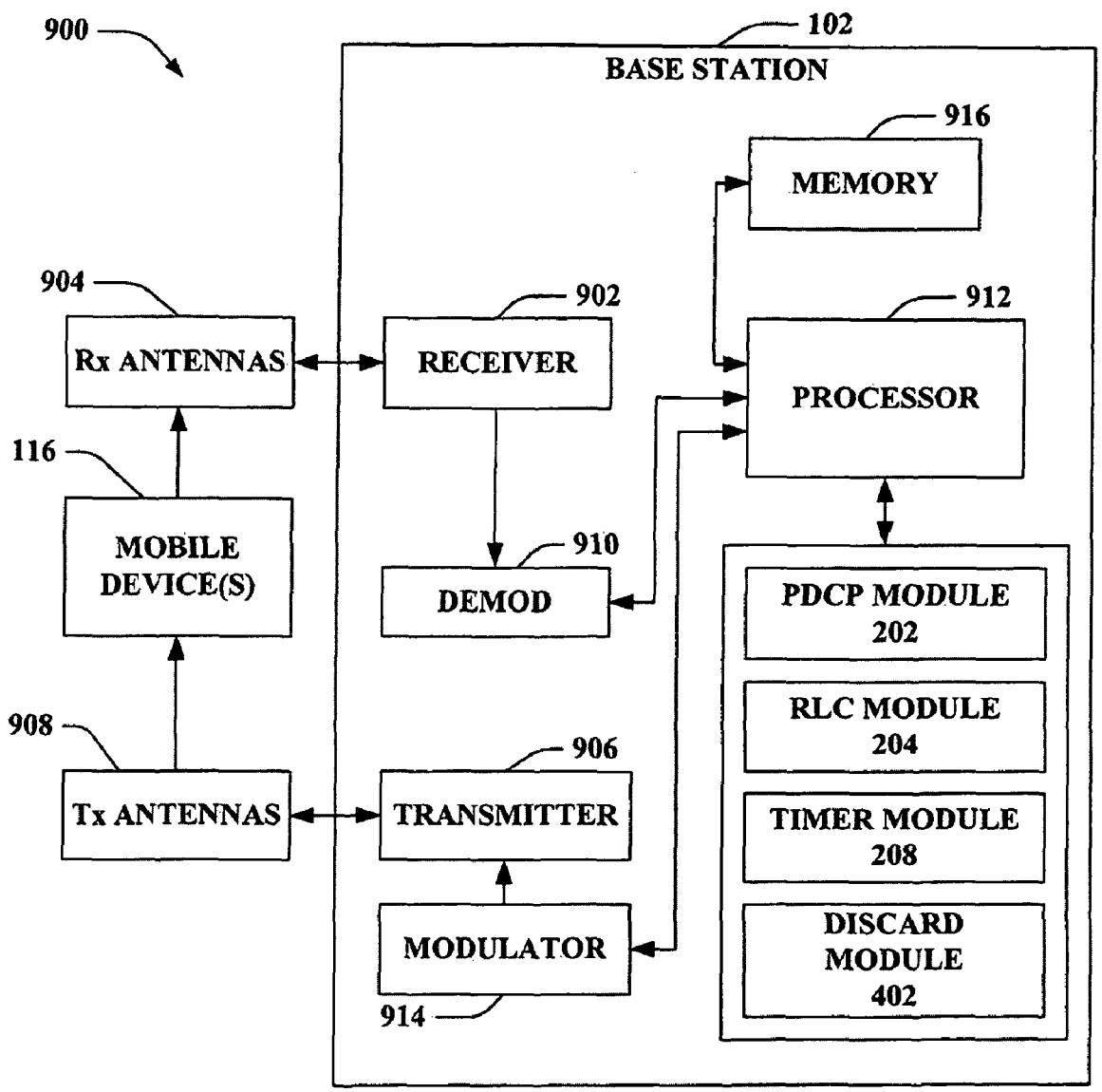
FIG. 9 is an illustration of an example system that facilitates discarding old data packets prior to transmission in a wireless communications system.

FIG. 9 is an illustration of a system 900 that can facilitate communications associated with a mobile device in a wireless communication system in accordance with an aspect of the disclosed subject matter. System 900 can comprise a base station 102 (e.g., access point, . . . ). The base station 102 can include a receiver 902 that can receive signal(s) from one or more mobile devices 116 through a plurality of receive antennas 904, and a transmitter 906 that can transmit signals (e.g., data) to the one or more mobile devices 116 through a transmit antenna 908. Receiver 902 can receive information from receive antennas 904 and can be operatively associated with a demodulator 910 that can demodulate received information. Demodulated symbols can be analyzed by a processor 912 that can be a processor dedicated to analyzing information received by receiver 902 and/or generating information for transmission by a transmitter 906, a processor that controls one or more components of base station 102, and/or a processor that both analyzes information received by receiver 902, generates information for transmission by transmitter 906, and controls one or more components of base station 102. The base station 102 can also comprise a modulator 914 that can work in conjunction with the transmitter 906 to facilitate transmitting signals (e.g., data) to, for instance, a mobile device 116, another device, etc.

Processor 912 can be connected with a PDCP module 202 that can manage the PDCP layer in wireless communications. For example, the PDCP module 202 can perform IP header compression and decompression, user data transfer, maintenance of sequence numbers for radio bearers and the like. In another aspect, the processor 912 can be connected to a RLC module 204 that can that provides RLC protocol layer functionality. The processor 912 also can be connected to a timer module 208 that can measure time that a data packet remains in the PDCP layer and/or the RLC layer, with respect to a QoS delay requirement, prior to transmission. The processor 912 also can be connected to a discard module 402 that can facilitate discarding IP packets that have been delayed in PDCP layer past timer expiration or RLC SDUs, RLC PDUs and PDCP SDUs that have not been successfully transmitted prior to timer expiration.

Base station 102 can additionally comprise memory 916 that is operatively coupled to processor 912 and that can store data to be transmitted, received data, information related to available channels, data associated with analyzed signal and/or interference strength, information related to an assigned channel, power, rate, or the like, and any other suitable information for estimating a channel and communicating via the channel. Memory 916 can additionally store protocols and/or algorithms associated with estimating and/or utilizing a channel (e.g., performance based, capacity based, etc.).

It will be appreciated that the memory 916 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 916 of the subject systems and methods is intended to comprise, without being limited to, these and any other suitable types of memory.

It is to be appreciated and understood that the PDCP module 202, RLC module 204, timer module 208, discard module 402, and memory 916 each can be the same or similar as, or can comprise the same or similar functionality as, respective components such as more fully described herein, for example, with regard to system 200, system 300, system 400, and system 500. It is to be further appreciated and understood that the PDCP module 202, RLC module 204, timer module 208, discard module 402, and memory 916 each can be a stand-alone unit (as depicted), can be included within the processor 912, can be incorporated within another component, and/or virtually any suitable combination thereof, as desired.

Figure 10:
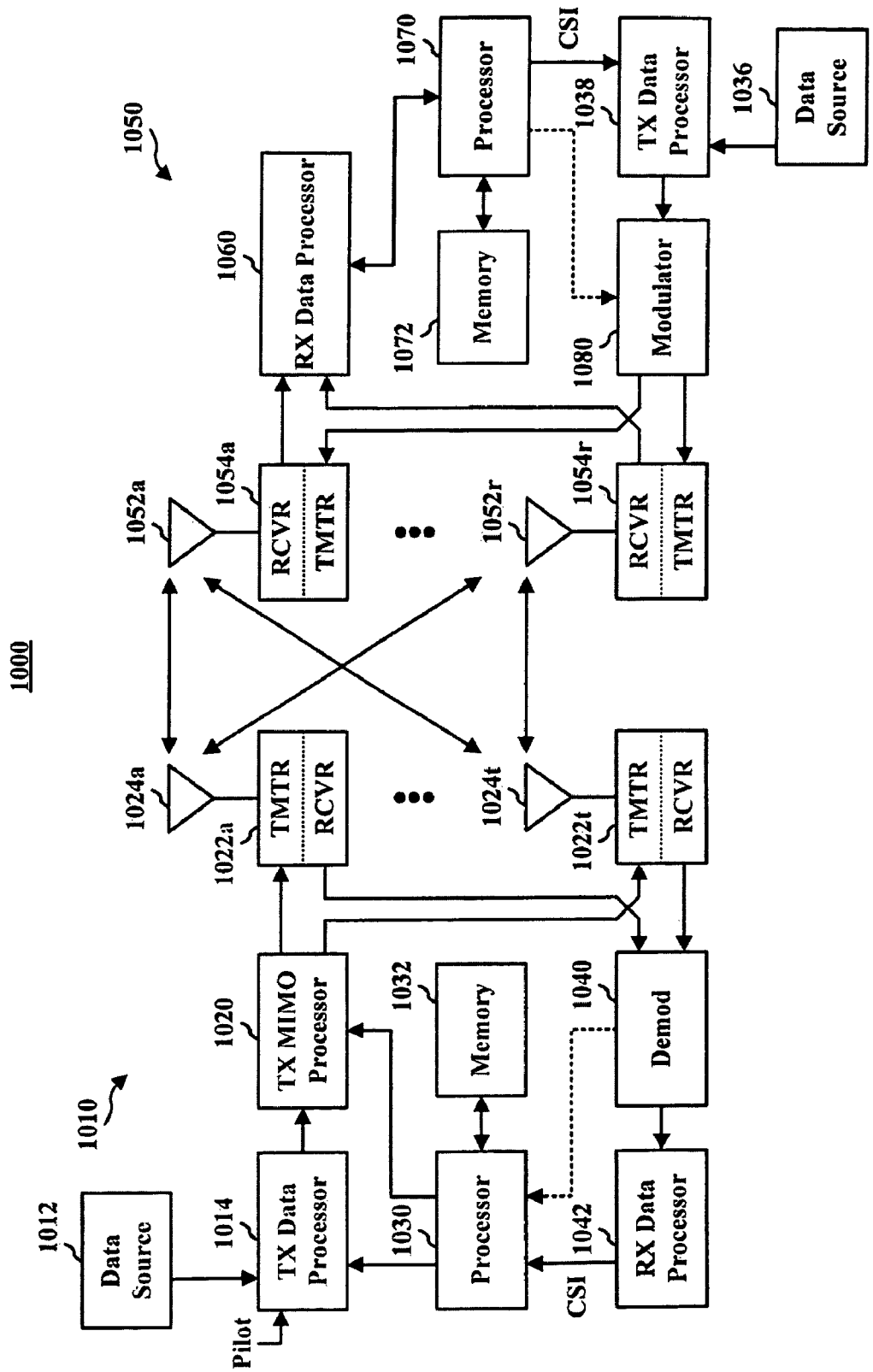
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1, 2, 4 and 8-9), examples (FIG. 4) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which preceding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
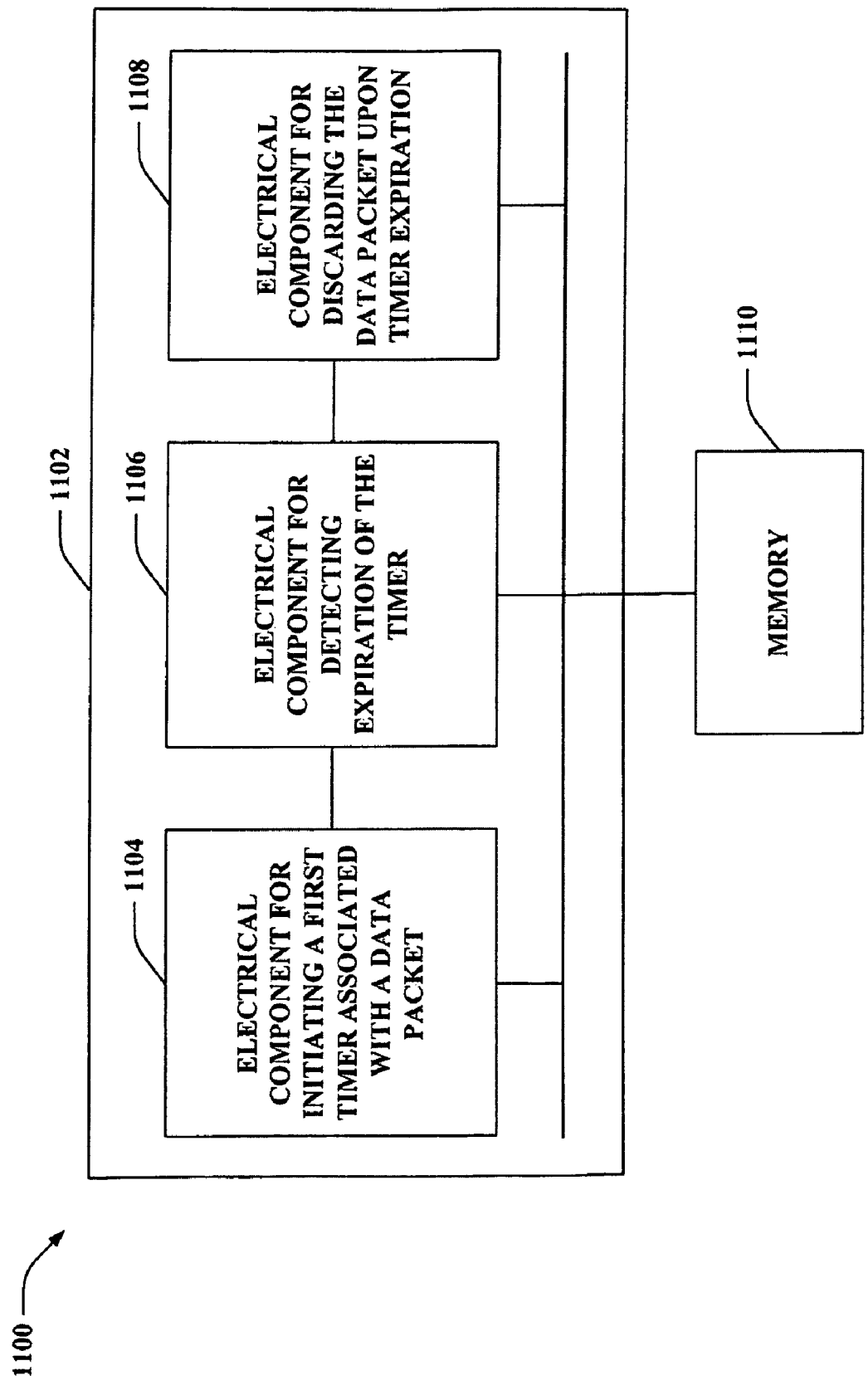
FIG. 11 is an illustration of an example system that identifies a keyset utilized in a data transmission.

With reference to FIG. 11, illustrated is a system 1100 that utilizes timers to enforce quality of service requirements. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for initiating a first timer associated with a data packet 1104. For instance, the timer can be initiated and associated when the data packet arrives at a packet data convergence protocol layer. Further, logical grouping 1102 can comprise an electrical component for detecting timer expiration 1106. Moreover, logical grouping 1102 can comprise an electrical component for discarding the data packet upon expiration of the timer 1108. Pursuant to an illustration, the data packet is discarded if the packet still resides at the packet data convergence protocol layer upon timer expiration. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
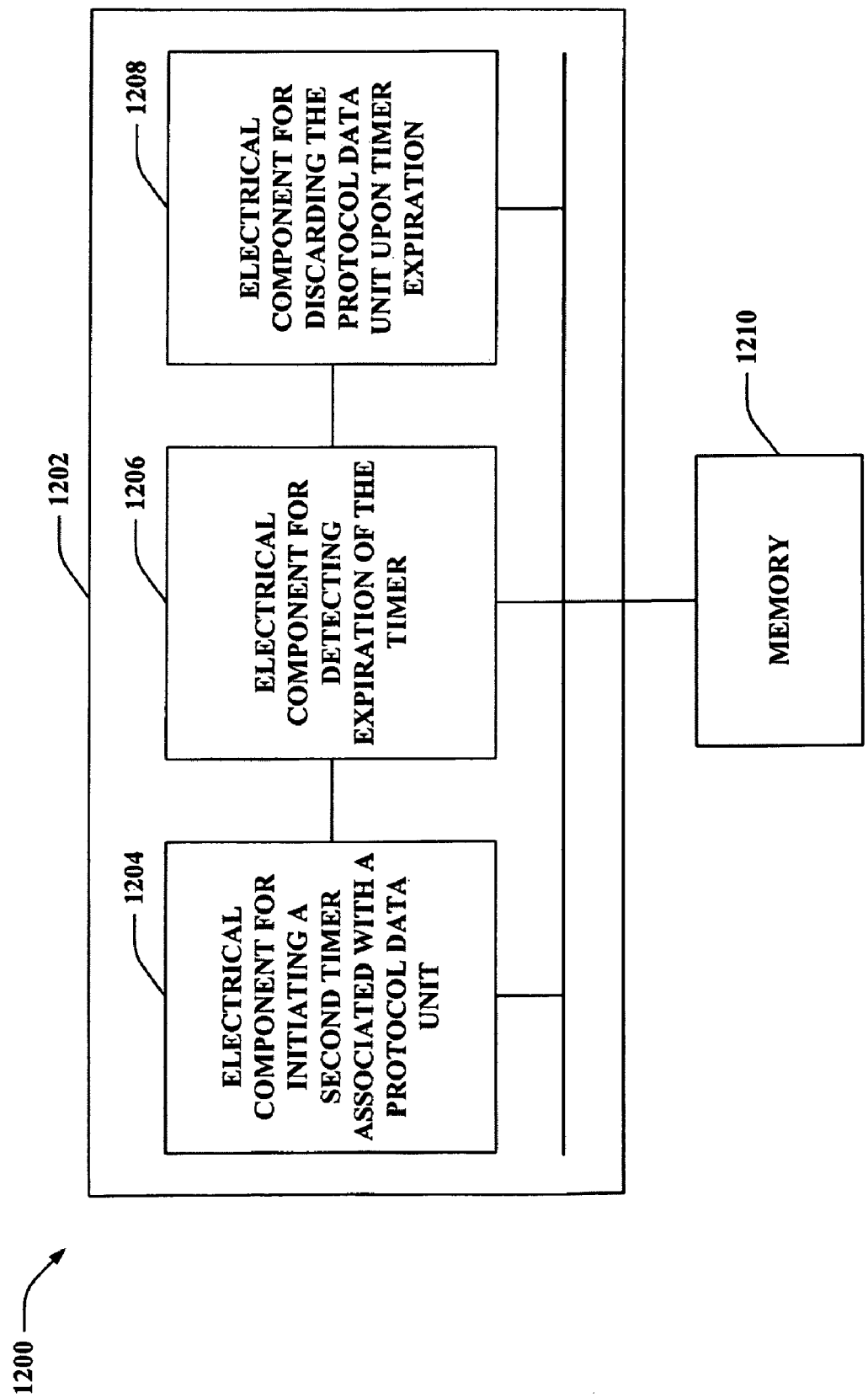
FIG. 12 is an illustration of an example system that facilitates specifying a keyset from a plurality of keyset employed in a transmission.

With reference to FIG. 12, illustrated is a system 1200 that utilizes timers to enforce quality of service requirements. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for initiating a second timer associated with a protocol data unit 1204. For instance, the timer can be initiated and associated when the protocol data unit, generated based upon a data packet at a PDCP layer, arrives at a radio link control layer. Further, logical grouping 1202 can comprise an electrical component for detecting timer expiration 1206. Moreover, logical grouping 1202 can comprise an electrical component for discarding the protocol data unit upon expiration of the timer 1208. Pursuant to an illustration, the data packet is discarded if the packet still resides at the packet data convergence protocol layer upon timer expiration. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates enforcing quality of service requirements, comprising:
    initiating a first timer associated with a data packet arriving at a packet data convergence protocol layer;
    starting a handover timer upon initiation of a handover operation, the handover timer being associated with the data packet retained in the packet data convergence protocol layer;
    detecting expiration of the first timer and the handover timer; and
    discarding the data packet when the data packet resides at the packet data convergence protocol layer upon expiration of both the first timer and the handover timer.

2. The method of claim 1, further comprising configuring the first timer based at least in part on a quality of service requirement corresponding to the data packet.

3. The method of claim 2, wherein the quality of service requirement includes a delay tolerance that specifies a maximum total delay allowed for the data packet to reach a receiver.

4. The method of claim 1, further comprising converting the data packet into a protocol data unit at the packet data convergence protocol layer.

5. The method of claim 4, further comprising:
    delivering the protocol data unit to a radio link control protocol layer; and
    stopping the first timer.

6. The method of claim 5, further comprising:
    starting a second timer associated with the protocol data unit upon arrival at the radio link control protocol layer;
    detecting expiration of the second timer; and
    discarding the protocol data unit when the protocol data unit resides at the radio link control protocol layer upon timer expiry.

7. The method of claim 6, further comprising configuring the second timer based at least in part on a delay tolerance corresponding to the protocol data unit and a measure of time spent in the packet data convergence protocol layer.

8. The method of claim 1, wherein the handover timer introduces additional allowable delay.

9. The method of claim 1, wherein the data packet is discarded when the handover timer expires prior to transfer of the data packet to a target base station.

10. A communications apparatus that facilitates discarding data packets delayed beyond a tolerance, comprising:
    a packet data convergence protocol (PDCP) module that obtains a data packet, the PDCP module generates a protocol data unit based upon the data packet;
    a radio link control (RLC) module that retains the protocol data unit generated by the PDCP module pending successful transmission;
    a timer module that initiates a PDCP timer for the data packet upon arrival at the PDCP module and starts a handover timer upon initiation of a handover operation, the handover timer being associated with the data packet retained in the packet data convergence protocol layer; and
    a discard module that, upon expiration of the PDCP timer and the handover timer, discards the data packet if the PDCP timer expires before generation of the protocol data unit and the handover timer expires before the data packet is transferred.

11. The communications apparatus of claim 10, wherein the PDCP timer is configured based at least in part on a quality of service requirement corresponding to the data packet.

12. The communications apparatus of claim 11, wherein the quality of service requirement includes a delay tolerance that specifies a maximum total delay allowed for the data packet to reach a receiver.

13. The communications apparatus of claim 10, wherein the timer module maintains the PDCP timer for the data packet when the protocol data unit is passed from the PDCP module to the RLC module.

14. The communications apparatus of claim 10, wherein the timer module stops the PDCP timer and starts a RLC timer when the protocol data unit arrives at the RLC module.

15. The communications apparatus of claim 10, wherein a handover timer is created for each data packet in a PDCP layer.

16. The communications apparatus of claim 10, wherein the handover timer introduces additional allowable delay to enable the data packet to transfer to a target base station.

17. A wireless communications apparatus that facilitates enforcing quality of service requirements, comprising:
    means for initiating a first timer associated with a data packet arriving at a packet data convergence protocol layer;
    means for starting a handover timer upon initiation of a handover operation, the handover timer being associated with the data packet retained in the packet data convergence protocol layer;
    means for detecting expiration of the first timer and the handover timer; and
    means for discarding the data packet when the data packet resides at the packet data convergence protocol layer upon expiration of both the first timer and the handover timer.

18. The wireless communications apparatus of claim 17, further comprising means for configuring the first timer based at least in part on a quality of service requirement corresponding to the data packet.

19. The wireless communications apparatus of claim 18, wherein the quality of service requirement includes a delay tolerance that specifies a maximum total delay allowed for the data packet to reach a receiver.

20. The wireless communications apparatus of claim 17, further comprising means for converting the data packet into a protocol data unit at the packet data convergence protocol layer.

21. The wireless communications apparatus of claim 20, further comprising:
   means for delivering the protocol data unit to a radio link control protocol layer; and
   means for stopping the first timer.

22. The wireless communications apparatus of claim 21, further comprising:
   means for starting a second timer associated with the protocol data unit upon arrival at the radio link control protocol layer;
   means for detecting expiration of the second timer; and
   means for discarding the protocol data unit when the protocol data unit resides at the radio link control protocol layer upon timer expiry.

23. The wireless communications apparatus of claim 22, further comprising means for configuring the second timer based at least in part on a delay tolerance corresponding to the protocol data unit and a measure of time spent in the packet data convergence protocol layer.

24. The wireless communications apparatus of claim 17, wherein the handover timer introduces additional allowable delay.

25. The wireless communications apparatus of claim 17, wherein the means for discarding the data packet discards the data packet when the handover timer expires prior to transfer of the data packet to a target base station.

26. A computer program product, comprising:
a non-transitory computer-readable medium comprising:
   code for causing at least one computer to initiate a first timer associated with a data packet arriving at a packet data convergence protocol layer;
   code for causing the at least one computer to start a handover timer upon initiation of a handover operation, the handover timer being associated with the data packet retained in the packet data convergence protocol layer;
   code for causing the at least one computer to detect expiration of the first timer and the handover timer; and
   code for causing the at least one computer to discard the data packet when the data packet resides at the packet data convergence protocol layer upon expiration of both the first timer and the handover timer.

27. In a wireless communication system, an apparatus comprising:
   at least one processor configured to:
      initiate a first timer associated with a data packet arriving at a packet data convergence protocol layer;
      start a handover timer upon initiation of a handover operation, the handover timer being associated with the data packet retained in the packet data convergence protocol layer;
      detect expiration of the first timer and the handover timer; and
      discard the data packet when the data packet resides at the packet data convergence protocol layer upon expiration of both the first timer and the handover timer.

* * * * *